United States Patent [19]

Waddill et al.

[11] 4,169,177
[45] Sep. 25, 1979

[54] POLYETHER DIUREIDE EPOXY ADDITIVES

[75] Inventors: Harold G. Waddill; Heinz Schulze, both of Austin, Tex.

[73] Assignee: Texaco Development Corp., White Plains, N.Y.

[21] Appl. No.: 891,580

[22] Filed: Mar. 30, 1978

[51] Int. Cl.² ............................................. C08G 59/48
[52] U.S. Cl. ..................................... 528/112; 528/93; 528/94; 528/111; 528/113; 528/367
[58] Field of Search ................ 260/830 P, 2 EA, 2 N, 260/47 EP, 47 EN; 528/93, 94, 111, 112, 113, 135, 136, 367

[56] References Cited

U.S. PATENT DOCUMENTS

| | | | |
|---|---|---|---|
| 2,839,480 | 7/1950 | Ott | 260/47 EN |
| 3,336,415 | 8/1967 | Kennedy | 260/830 P |
| 3,591,556 | 7/1971 | Godfrey et al. | 260/47 EN |
| 4,002,598 | 1/1977 | Waddill et al. | 260/2 N |

OTHER PUBLICATIONS

"Epoxy Resins," Lee-Neville, 1957, McGraw-Hill Book Co., Inc., N. Y., p. 110.

*Primary Examiner*—J. Ziegler
*Attorney, Agent, or Firm*—Carl G. Ries; Thomas H. Whaley; Kenneth R. Priem

[57] ABSTRACT

Resistance to thermal shock of certain anhydride cured epoxy resins is unexpectedly enhanced by addition of a diamide of a polyoxyalkylenepolyamine-urea condensate. This superior resistance does not appreciably compromise heat deflection properties. The resins comprise a vicinal polyepoxide, a curing amount of a certain bicyclic anhydride and an effective amount of a diamide of a polyoxyalkylenepolyamine-urea condensate having a molecular weight of from about 4000 to 4500.

20 Claims, No Drawings

POLYETHER DIUREIDE EPOXY ADDITIVES

BACKGROUND OF THE INVENTION

1. Field of the Invention

This invention relates to curable epoxy resins having increased thermal shock resistance; and, more particularly, to certain anhydride cured epoxy resins containing a diamide of a polyoxyalkylenepolyamine-urea condensate.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents are generally the anhydrides. The most commonly used anhydride curing agents are difunctional materials such as maleic anhydride, phthalic anhydride and the like, as well as tetrafunctional materials such as pyromellitic dianhydride.

Also known to be effective as epoxy curing agents or co-curing agents are various ureas and substituted ureas, such as those disclosed in U.S. Pat. Nos. 3,294,749, 2,713,569, 3,386,956, 3,386,955, 2,855,372 and 3,639,338. The ureas disclosed in the above references are useful as either a sole curing agent or as curing accelerators.

Aliphatic or aromatic compounds having a single terminal ureido group are well known. It has been disclosed in U.S. Pat. No. 2,145,242 to Arnold that diureido terminated aliphatic compounds can be produced by reacting an aliphatic diamine wherein each terminal amine has at least one labile hydrogen with urea. Other substituted ureas are disclosed in U.S. Pat. No. 3,965,072.

Epoxy resins for casting, embedding or encapsulating etc. must withstand repeated cycles of high and low temperatures without cracking. However, lowering the temperature increases stress due to shrinkage and reduces the ability of the resin to flow, thus relieving the stress.

Anydride cured resins are useful in applications where high heat deflection is required. However, such materials exhibit brittleness and thus a low resistance to thermal shock. Diluents and modifiers do improve thermal shock resistance properties but, unfortunately adversely influence the heat deflection properties as shown in May and Tanaka, *Epoxy Resins*, New York, 1973, p. 299. Likewise, plasticizers have not found wide acceptance in epoxy technology primarily because most of them are incompatible with the cured resins.

It has now been unexpectedly found that a diamide of a polyoxyalkylenepolyamine-urea condensate having a molecular weight of from about 4000 to about 4500, when employed as an epoxy additive, provides cured epoxy resin compositions exhibiting outstanding thermal shock resistance. Specifically, epoxy resins incorporating these additives, upon curing with a specific bicyclic anhydride curing agent, provide a material with high heat deflection and superior resistance to thermal shock.

The cured epoxy resin compositions of the instant invention are useful as coatings, castings, and sealants.

SUMMARY OF THE INVENTION

According to the broad aspect of the instant invention, the thermal shock resistance of an epoxy resin cured with an alkyl substituted bicyclo vicinal anhydride is enhanced by the addition of an effective amount of a diamide of a polyoxyalkylenepolyamine-urea condensate having a molecular weight of from 4000 to 4500.

In one aspect, a curable epoxy resin composition having superior thermal shock resistance comprises a vicinal polyepoxide; a curing amount of bicyclic vicinal anhydride curing agent of a Diels-Alder adduct of a substituted cyclopentadiene and maleic anhydride; and, an effective amount of a diamide of a polyoxyalkylenepolyamine-urea condensate additive.

In accordance with a preferred embodiment, a diglycidyl ether of 4,4'-isopropylidene bisphenol, a curing amount of a methyl-bicyclo[2,2,1]heptene-2,3-dicarboxylic anhydride curing agent, a dimethylaminomethyl substituted phenol accelerator and an effective amount of a diamide of a polyoxyalkylenepolyamine-urea condensate having a molecular weight of about 4000 are utilized to form a resin.

DETAILED DESCRIPTION OF THE INVENTION

According to the instant inventive concept, blends of a polyepoxide, an anhydride curing agent and a diamide of a polyoxyalkylenepolyamine-urea condensate and, optionally, an accelerator are thoroughly admixed and cured in accordance with conventional methods to provide cured epoxy resins having unexpectedly superior thermal shock resistance while maintaining heat deflection properties.

Generally the vicinal polyepoxide containing compositions which are amine cured are organic materials having an average of at least 1.8 reactive, 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be anhydride cured and are in accordance with the instant invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The anhydride curing agents which can be utilized in accordance with the instant invention are generally the alkyl substituted bicyclic vicinal anhydrides, for example, the Diels-Alder adduct of maleic anhydride and a substituted cyclopentadiene. Preferred compounds generally have the formula:

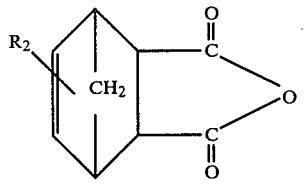

wherein R is a lower alkyl and, more preferably, a lower alkyl of from 1 to 4 carbon atoms. Preferred lower alkyl groups include methyl, ethyl, propyl, and n-butyl. The most preferred alkyl is methyl. The most preferred anhydride is methyl-bicyclo[2,2,1]heptane-2,3-dicarboxylic anhydride.

The diamide of a polyoxyalkylenepolyamine-urea condensate additive can generally be depicted by the formula:

X(NHZ—NHX—R')$_2$ wherein
R' is an alkyl radical, an aryl radical or hydrogen, and X is a C=O or a C=S radical, and Z is a polyoxyalkylene radical of molecular weight ranging from about 1800 to 2300.

The diamides of polyoxypolyamine-urea condensates are formed by the reaction of a carboxylic acid or a derivative thereof. with a polyoxyalkylene polyamine-urea condensate having a molecular weight value such that the diamide product has a molecular weight of from about 4000 to about 4500. The polyoxyalkylenepolyamine-urea condensate is formed, for example, by the reaction of about 2 moles of a polyoxyalkylene diamine for each mole of urea.

Optionally, the epoxy resin formulations of the instant invention can include an "accelerator" to speed the anhydride cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7–14 describes the use of certain amine-containing compounds as epoxy curing agent-accelerators.

Accelerators are known in the art which can be utilized in accordance with the instant invention; for example tertiary amines such as those disclosed in U.S. Pat. No. 2,839,480. Preferred accelerators in accordance with the instant invention are the dialkyl amine substituted aromatics; and, preferably, the dimethyl amino methyl substituted phenols.

According to the method of the instant invention, the thermal shock resistant properties of certain prior art anhydride cured epoxy resins are enhanced by the addition of an effective amount of a diamide of a polyoxyalkylenepolyamine-urea condensate having a molecular weight of from about 4000 to about 4500 as hereinbefore described. The amount of additive effective in bringing about the increased adhesive property is somewhat empirical and will depend upon the resin, and the use of an accelerator. Generally, the diamide additive can be utilized in amounts from about 2 to about 50 parts by weight based on one hundred parts by weight of the resin constituent; and, preferably, from about 5 to about 20 parts by weight.

The curable epoxy resin compositions of the instant invention generally comprise a vicinal polyepoxide, a curing amount of the alkyl substituted bicyclic vicinal anhydride curing agent and an effective amount of the diamide additive. Optionally an accelerator can be added.

The anhydride cured resins, having superior thermal shock resistance without substantial deterioration of heat deflection, in accordance with the instant invention, are prepared in a conventional manner. The anhydride curing agent is admixed with the polyepoxide composition in amounts according to the functional carboxyl equivalent weight of the curing agent employed. Generally the number of equivalents of carboxyl groups is from about 0.8 to about 1.2 times the number of epoxide equivalents present in the curable epoxy resin composition, with from 0.9 to a stoichiometric amount being preferred. When using an accelerator, amounts from 1 to about 5 parts by weight based on 100 parts by weight of the resin are generally satisfactory. The exact amount of constituents in accordance with the above general requirements will depend primarily on the application for which the cured resin is intended.

The diamide additive is incorporated into the uncured resin by admixing. Preferably, the additive is first admixed with the curing agent and/or the accelerator prior to addition to the resin. The constituents forming the curable material are then intimately admixed by standard methods and degassed in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material.

In accordance with a preferred embodiment, a curable resin comprises a diglycidyl ether of 4,4'-isopropylidene bisphenol; a curing amount of an anhydride curing agent consisting essentially of methyl bicyclo[2,2,1]heptene 2,3-dicarboxylic anhydride, an accelerator of dimethylaminomethyl substituted phenol; and, an effective amount of a diamide of a polyoxyalkylenepolyamine-urea condensate having a molecular weight of about 4000. According to a greatly preferred embodiment, from about 80 to about 90 parts by weight of curing agent is used per 100 parts of resin.

A preferred ratio of constituents comprises from about 1 to about 5 parts by weight of accelerator; from 80 to 90 parts by weight anhydride curing agent; and from 5 to 35 parts by weight additive wherein all of the above amounts are based on 100 parts by weight of the resin. Generally, the mixture of epoxy resin, the diamide, anhydride curing agent, and the accelerator is allowed to self-cure at elevated temperatures up to about 200° C.

According to a greatly preferred embodiment, resins of the polyglycidyl ether of polyhydric phenol type are cured by incorporating therein from about 80 to 90 parts by weight of methyl bicyclo[2,2,1]heptene-2,3-dicarboxylic anhydride; from about 5 to 40 parts by weight of a diamide of a polyoxyalkylenepolyamine-urea condensate having a molecular weight of about 4000 and from 1 to 5 parts by weight of an accelerator consisting essentially of dimethylaminomethyl substituted phenol. The composition is cured at temperatures in the range of 100° C. to 190° C. to produce products having superior thermal shock resistance in accordance with the instant invention.

It will further be realized that various conveniently employed additives can be admixed with the polyepoxide containing composition of the instant invention prior to final cure. For example, in certain instances it may be desired to add minor amounts of other anhydride co-catalysts. Additionally, conventional pigments, dyes, fillers, flame retarding agents and the like which are compatible, natural or synthetic resins can be added.

Furthermore, although not preferred, known solvents for polyepoxide materials such as toluene, benzene, xylene, dioxane, ethylene glycol monomethylether and the like can be used. The polyepoxide resins containing the additives of the instant invention can be used in any of the above applications for which polyepoxides are customarily used.

The compositions of the instant invention can be used as impregnants, surface coatings, pottings, capsulating compositions, and laminates.

The following examples illustrate the nature of the instant invention but are not intended to be limitative thereof.

EXAMPLE 1

This example demonstrates the preparation of a diamide(bisformamide) of a polyoxyalkylenediamine-urea condensate of about 4000 molecular weight. Initially a product, which is polyoxypropylene diamine of about 2000 molecular weight condensed with urea in a 2:1 molar ratio (such as JEFFAMINE® DU-3000 from Jefferson Chemical Co.), is reacted to form a diamide as follows:

A mixture of JEFFAMINE® DU-3000 (0.52 meq./g. primary amine; 1331 g (0.31 moles), toluene (122 g.) and 90% formic acid (47 g., 0.92 moles) was heated at reflux and with stirring under nitrogen. An aqueous phase (20.6 g.) was removed in a Dean-Stark trap. The product was stripped under vacuum (155°–170° C./10 MM.). The liquid product analyzed as follows: total amine 0.02 meq./g., total acetylatables 0.12 meq./g.

EXAMPLE 2

This example demonstrates the preparation of a diamide(bisbenzamide) of a polyoxyalkylene diamine-urea condensate of about 4000 molecular weight. JEFFAMINE® DU-3000 is reacted to form a diamide as follows:

A mixture of JEFFAMINE® DU-3000 (0.52 meq/g. primary amine, Bis(Benzamide) 14–20 g., 0.33 moles), toluene (100 g.) and benzoic acid (80 g., 0.66 mole) was heated at reflux (156°–220° C.) while the aqueous phase was collected in a Dean-Stark trap. The product was stripped under vacuum (195°–216° C./2 MM). The product analyzed as follows—total amine 0.24 meq./g., primary amine 0.23 meq./g., total acetylatables 0.27 meq./g.

EXAMPLE 3

This example demonstrates the effect of a diamide of a polyoxyalkylenepolyamine-urea condensate prepared in Example 1 on thermal shock properties of an epoxy resin (diglycidyl ether of 4,4'-isopropylidene bisphenol) cured with a methyl-bicyclo[2,2,1]heptene-2,3-dicarboxylic anhydride ("NADIC Methyl Anhydride" sold by Allied Chemical Corporation, Morristown, N.J. 07960). An accelerator, a dimethylaminomethyl substituted phenol ("DMP-10" sold by Rohm and Haas, Philadelphia, Pa., 19105), was also added to the formulation.

| Formulation: | A | B | C | D |
|---|---|---|---|---|
| Epoxy resin (EEW 190) | 100 | 100 | 100 | 100 |
| NADIC Methyl anhydride | 85 | 85 | 85 | 85 |
| DMP-10 (Rohm and Haas) | 2.5 | 2.5 | 2.5 | 2.5 |
| Diamide of Example 1 | — | 5 | 10 | 20 |

Thermal shock test samples were prepared by encapsulating a steel washer inside an aluminum evaporating dish. Test samples were cured two hours at 100°, one hour at 130° and three hours at 150° C. Ten test samples were prepared from each formulation and these were cycled ten times or until cracked.

Thermal cycle: in oven at 140° C. (30 mins.),

-continued in bath at −20° C. (15 mins.),
at room temperature (15 mins.). Examined for cracking and, if unchanged, recycled to oven.

No. of samples cracked during cycle no. -

| Formulation: | 1 | 2 | 3 | 4 | 5 | 6 | 7 | 8 | 9 | 10 | Total |
|---|---|---|---|---|---|---|---|---|---|---|---|
| A | 6 | 1 | 3 | — | — | — | — | — | — | — | 10 |
| B | 3 | 0 | 2 | 1 | 0 | 0 | 2 | 1 | 0 | 1 | 10 |
| C | 0 | 0 | 0 | 0 | 5 | 1 | 2 | 1 | 0 | 0 | 9 |
| D | 0 | 0 | 0 | 0 | 0 | 0 | 0 | 0 | 0 | 0 | 0 |

EXAMPLE 4

This example demonstrates the effect of a diamide of a polyoxyalkylenepolyamine-urea condensate as prepared in Example 1 on thermal shock properties of the epoxy resin used in Example 3 cured with hexahydrophthalic anhydride. An accelerator, benzyldimethylamine was also used.

| Formulation: | A | B | C | D |
|---|---|---|---|---|
| Epoxy resin (EEW 190) | 100 | 100 | 100 | 100 |
| Hexahydrophthalic anhy. | 78 | 78 | 78 | 78 |
| Benzyldimethylamine | 1 | 1 | 1 | 1 |
| Diamide of Example 1 | — | 5 | 10 | 20 |

Thermal shock test samples cured 2 hours 100°, 1 hr. 130°, 3 hrs. 150° C.
No. of samples cracked during cycle no. -

| Formulation | 1 | 2 | 3 | 4 | 5 | 6 | 7 | 8 | 9 | 10 | Total |
|---|---|---|---|---|---|---|---|---|---|---|---|
| A | 4 | 1 | 1 | 0 | 1 | 0 | 0 | 0 | 1 | 0 | 8 |
| B | 9 | 0 | 1 | — | — | — | — | — | — | — | 10 |
| C | 10 | — | — | — | — | — | — | — | — | — | 10 |
| D | 2 | 0 | 0 | 0 | 1 | 0 | 0 | 0 | 0 | 0 | 3 |

EXAMPLE 5

This example demonstrates the effect of a diamide of a polyoxyalkylenepolyamine-urea condensate as prepared in Example 1 on thermal shock properties of the epoxy resin used in Example 3 cured with phthalic anhydride. An accelerator, benzyldimethylamine was also used.

| Formulation | A | B |
|---|---|---|
| Epoxy resin (EEW 190) | 100 | 100 |
| Phthalic anhydride | 75 | 75 |
| Benzyldimethylamine | 1 | 1 |
| Diamide of Example 1 | — | 30 |

Thermal shock test samples cured one hr. 100°, four hours, 160° C. No. of samples cracked during cycle no. -

| Formulation | 1 | 2 | 3 | 4 | 5 | 6 | 7 | 8 | 9 | 10 | Total |
|---|---|---|---|---|---|---|---|---|---|---|---|
| A | 6 | 2 | 0 | 0 | 1 | 0 | 0 | 0 | 0 | 0 | 9 |
| B | 4 | 4 | 0 | 0 | 0 | 1 | 0 | 0 | 0 | 0 | 9 |

EXAMPLE 6

This example demonstrates the effect of a diamide of a polyoxyalkylenepolyamine-urea condensate as prepared in Example 2 on thermal shock properties of the epoxy resin used in Example 3 cured with NADIC Methyl Anhydride. An accelerator, DMP-10, was also used.

| Formulation | A | B | C |
|---|---|---|---|
| Epoxy resin (EEW 190) | 100 | 100 | 100 |
| NADIC Methyl anhydride | 85 | 85 | 85 |
| DMP-10 (Rohm and Haas) | 2.5 | 2.5 | 2.5 |
| Diamide of Example 2 | — | 10 | 30 |

Thermal shock test samples were cured 2 hrs. 100°, 1 hr. 130°, 3 hrs. 150° C.
No. of samples cracked during cycle no. -

| Formulation | 1 | 2 | 3 | 4 | 5 | 6 | 7 | 8 | 9 | 10 | Total |
|---|---|---|---|---|---|---|---|---|---|---|---|
| A | 6 | 1 | 3 | — | — | — | — | — | — | — | 10 |
| B | 7 | 0 | 0 | 0 | 0 | 1 | 0 | 0 | 0 | 0 | 8 |
| C | 0 | 0 | 0 | 0 | 0 | 0 | 0 | 0 | 0 | 0 | 0 |

EXAMPLE 7

This example demonstrates the effect of a diamide of a polyoxyalkylenepolyamine-urea condensate as prepared in Example 2 on thermal shock properties of the epoxy resin used in Example 3 cured with Hexahydrophthalic Anhydride. An accelerator, benzyldimethylamine, was also used.

| Formulation | A | B | C |
|---|---|---|---|
| Epoxy resin (EEW 190) | 100 | 100 | 100 |
| Hexahydrophthalic anhydride | 78 | 78 | 78 |
| Benzyldimethylamine | 1 | 1 | 1 |
| Diamide of Example 2 | — | 20 | 30 |

No. of samples cracked during cycle no. -

| Formulation | 1 | 2 | 3 | 4 | 5 | 6 | 7 | 8 | 9 | 10 | Total |
|---|---|---|---|---|---|---|---|---|---|---|---|
| A | 4 | 1 | 1 | 0 | 1 | 0 | 0 | 0 | 1 | 0 | 8 |
| B | 4 | 0 | 0 | 0 | 0 | 0 | 0 | 0 | 0 | 0 | 4 |
| C | 1 | 0 | 0 | 0 | 0 | 0 | 0 | 0 | 0 | 0 | 1 |

EXAMPLE 8

This example demonstrates the effect of a diamide of a polyoxyalkylenepolyamine-urea condensate as prepared in Example 2 on thermal shock properties of the epoxy resin used in Example 3 cured with Phthalic Anhydride. An accelerator, benzyldimethylamine, was also used.

| Formulation | A | B |
|---|---|---|
| Epoxy resin (EEW 190) | 100 | 100 |
| Phthalic anhydride | 75 | 75 |
| Benzyldimethylamine | 1 | 1 |
| Diamide of Example 2 | — | 30 |

Thermal shock test samples cured 1 hr. 100°, 4 hrs. 160° C.
No. of samples cracked during cycle no. -

| Formulation | 1 | 2 | 3 | 4 | 5 | 6 | 7 | 8 | 9 | 10 | Total |
|---|---|---|---|---|---|---|---|---|---|---|---|
| A | 6 | 2 | 0 | 0 | 0 | 1 | 0 | 0 | 0 | 0 | 9 |
| B | 0 | 0 | 0 | 0 | 0 | 0 | 0 | 0 | 0 | 0 | 0 |

We claim:
1. An epoxy resin composition having superior resistance to thermal shock and being the cured product of a curable admixture which comprises:
   a vicinal polyepoxide having an average of at least 1.8 reactive, 1,2-epoxy groups per molecule;
   a curing amount of a substituted bicyclic vicinal anhydride curing agent; and,
   an effective amount of an additive comprising a diamide of a polyoxyalkylenepolyamine-urea condensate having a molecular weight of from about 4000 to about 4500.

2. The composition of claim 1 further comprising an effective amount of a compound effective in accelerating the cure.

3. The composition of claim 1 wherein the anhydride is the Diels-Alder adduct of malic anhydride and a substituted cyclopentadiene.

4. The composition of claim 1 wherein said anhydride curing agents are of the formula:

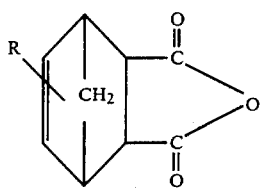

wherein R is a lower alkyl.

5. The composition of claim 1 wherein the diamide is of the formula:

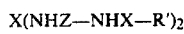

wherein R' is an alkyl radical, an aryl radical or hydrogen, X is a C=O or a C=S radical and Z is a polyoxyalkylene radical of molecular weight ranging from about 1800 to 2300.

6. The composition of claim 5 wherein X is a C=O radical.

7. The composition of claim 1 wherein said vicinal polyepoxide is more than 80% by weight of a polyglycidyl ether of polyhydric phenols.

8. The composition of claim 7 wherein said vicinal polyepoxide is a polyglycidyl ether of a polyhydric phenol.

9. A method for increasing the adhesive strength of an epoxy resin composition, being the cured product of a curable admixture comprising a vicinal polyepoxide having an epoxide equivalency of greater than 1.8; and, a curing amount of a substituted bicyclic vicinal anhydride curing agent comprising the step of:
adding to said curable admixture an effective amount of a diamide of a polyoxyalkylenepolyamine-urea condensate having a molecular weight of from about 4000 to 4500.

10. The method of claim 9 wherein said diamide is of the formula

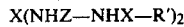

wherein R' is an alkyl radical, an aryl radical or hydrogen, X is a C=O or a C=S radical and Z is a polyoxyalkylene radical of molecular weight ranging from about 1800 to 2300.

11. The method of claim 10 wherein R' is hydrogen.

12. The method of claim 10 wherein R' is a lower alkyl radical selected from the group consisting of methyl, ethyl, n-propyl and n-butyl.

13. The method of claim 10 wherein said curable admixture further comprises an effective amount of a compound effective in accelerating the cure.

14. The method of claim 10 wherein said vicinal polyepoxide is more than 80% by weight of a polyglycidyl ether of polyhydric phenols.

15. The method of claim 14 wherein said vicinal polyepoxide is a polyglycidyl ether of a polyhydric phenol.

16. A curable resin composition comprising a diglycidyl ether of 4,4'-isopropylidene bisphenol polyepoxide; a curing amount of a substituted bicyclic vicinal anhydride curing agent and, an effective amount of a diamide of a polyoxyalkylenepolyamine-urea condensate additive having a molecular weight of about 4000.

17. The resin of claim 16 wherein said anhydride curing agent is present in about a stoichiometric amount and said additive is present in amount from about 2 to 50 parts by weight based on 100 parts by weight of said polyepoxide.

18. In an epoxy resin composition, being the cured product of a curable admixture comprising a vicinal polyepoxide having an epoxide equivalency greater than 1.8; and, a curing amount of a substituted bicyclo vicinal anhydride curing agent, the improvement which comprises:
increasing the adhesion properties of said cured product by addition of an effective amount of a diamide of a polyoxyalkylenepolyamine-urea condensate having a molecular weight of from about 4000 to 4500.

19. The method of claim 18 wherein said diamide is of the formula:

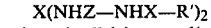

wherein R' is an alkyl radical, an aryl radical or hydrogen, X is a C=O or a C=S radical and Z is a polyoxyalkylene radical of molecular weight ranging from about 1800 to 2300.

20. As an additive for increasing the adhesive strength of an anhydride cured epoxy resin, a composition of the formula:

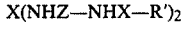

wherein R' is an alkyl radical, an aryl radical or hydrogen, X is a C=O or a C=S radical and Z is a polyoxyalkylene radical of molecular weight ranging from about 1800 to 2300.

* * * * *